(12) United States Patent
Nishikawa et al.

(10) Patent No.: US 7,733,500 B2
(45) Date of Patent: Jun. 8, 2010

(54) WAVEFRONT SENSOR WITH OPTICAL PATH DIFFERENCE COMPENSATION

(75) Inventors: Jun Nishikawa, Tokyo (JP); Yutaka Hayano, Tokyo (JP)

(73) Assignee: National Institutes of Natural Sciences, Tokyo (JP)

( * ) Notice: Subject to any disclaimer, the term of this patent is extended or adjusted under 35 U.S.C. 154(b) by 4 days.

(21) Appl. No.: 12/232,370

(22) Filed: Sep. 16, 2008

(65) Prior Publication Data

US 2009/0161115 A1    Jun. 25, 2009

(30) Foreign Application Priority Data

Dec. 21, 2007    (JP)    ............................. 2007-330023

(51) Int. Cl.
*G01B 11/02*    (2006.01)
(52) U.S. Cl. .................................................... 356/512
(58) Field of Classification Search ................. 356/512, 356/520
See application file for complete search history.

(56) References Cited

U.S. PATENT DOCUMENTS 6,580,509 B1 * 6/2003 Hutchin et al. .............. 356/451
7,538,890 B2 * 5/2009 Ge et al. ..................... 356/512
2003/0223077 A1 12/2003 Hill
2006/0154156 A1 7/2006 Farah

FOREIGN PATENT DOCUMENTS

JP    7-77413 A    3/1995

* cited by examiner

*Primary Examiner*—Tarifur Chowdhury
*Assistant Examiner*—Jonathon D Cook
(74) *Attorney, Agent, or Firm*—Birch, Stewart, Kolasch & Birch, LLP

(57) ABSTRACT

In a wavefront sensor, an optical wavefront to be measured is split into a first optical path and a second optical path. A wavefront W1 in the first optical path is transmitted through a first compensation member 7, and a wavefront W2 in the second optical path is transmitted through a second compensation member 8. Wavefronts W1 and W2 are mixed together by a semi-transparent mirror 6 with the wavefronts being displaced from each other by a shearing quantity S to form an interference fringe. An optical path difference that occurs between two wavefronts W1' and W2' which reach the interference measurement plane M in a state where the wavefronts are inclined due to the arrival direction of the optical wavefront to be measured is compensated when the wavefronts W1' and W2' are transmitted through the first and second optical path difference compensation members 7 and 8, respectively.

12 Claims, 9 Drawing Sheets

WAVEFRONT SENSOR WITH OPTICAL PATH DIFFERENCE COMPENSATION

BACKGROUND OF THE INVENTION

1. Field of the Invention

The present invention relates to a wavefront sensor, and more particularly, to a sensor that measures a wavefront of a lightwave by using shearing interferometry.

2. Description of the Related Art

Interferometers using an interference phenomenon of the lightwave have been widely used for high-precision measurements because noncontact measurement is enabled with a precision that is equal to or better than the wavelength of light.

For example, JP 07-77413 A discloses a shearing interferometer that splits an optical wavefront to be measured into two optical paths, displaces the positions of those wavefronts from each other, mixes those wavefronts together again to measure the configuration of the optical wavefront to be measured based on the interference fringe of the mixed optical wavefront.

However, it is known that, when the wavefronts that have been split into the two optical paths are mixed together again to observe the interference fringe (intensity after interference) on the interference measurement plane, the propagation optical path difference between those two optical paths up to the interference measurement plane varies depending on the arrival direction of the optical wavefront to be measured. Accordingly, different interference states are formed for different directions along which the optical wavefronts to be measured arrive. As a result, lights having different interference states are combined together on the interference measurement plane for wavefronts from a light source that cannot be regarded as one point, or for wavefronts from a point light source that moves beyond a distance that can be regarded as one point due to the vibrations of a device or the like. This causes such a problem that the wavefront configuration cannot be measured by observing the interference fringe.

The present invention has been made to eliminate the above problem, and therefore an object of the present invention is to provide a wavefront sensor which is capable of measuring wavefronts from light sources which cannot be regarded as one point such as surface light sources, a plurality of point light sources, or wavefronts from point light sources that move beyond a distance that can be regarded as one point.

SUMMARY OF THE INVENTION

A wavefront sensor according to the present invention splits an optical wavefront to be measured into two optical paths, displaces the split optical wavefronts from each other, and mixes the wavefronts together again to measure a configuration of the optical wavefronts to be measured from an interference fringe formed on an interference measurement plane. The wavefront sensor comprises optical path difference compensation members, which are arranged on the two optical paths respectively, for imaging each of the wavefronts that once have been split into the two optical paths, and again collimating the imaged wavefronts to remove an optical path difference that occurs depending on the incident angle of the optical wavefront to be measured, wherein a propagation optical path difference between the two optical paths up to the interference measurement plane is kept constant regardless of the incident angle of the optical wavefront to be measured.

Note that, it is preferable that each of the optical path difference compensation members has at least one lens which is inclined with respect to a corresponding optical path by a predetermined angle, and that both of the optical path difference compensation members are arranged so that the lenses are inclined with respect to the two optical paths in opposite directions.

In this case, each of the optical path difference compensation members can be constituted to have an imaging lens and a collimator lens.

According to the present invention, an optical path difference compensation member for removing an optical path difference that occurs depending on the incident angle of the optical wavefront to be measured is arranged on each of the two split optical paths respectively, thereby making constant the propagation optical path difference between the two optical paths up to the interference measurement plane regardless of the incident angle of the optical wavefront to be measured. As a result, the same interference state is obtained on the interference measurement plane even if the optical wavefronts to be measured arrive from different directions. For that reason, lights of the same interference state are combined together on the interference measurement plane for the wavefronts from a light source that cannot be regarded as one point, or the wavefronts from a point light source that moves beyond a distance that can be regarded as one point. This enables the measurement of each wavefront by the observation of the interference fringe.

DESCRIPTION OF THE PREFERRED EMBODIMENTS

Hereinafter, a description will be given of embodiments of the present invention with reference to the accompanying drawings.

First Embodiment

Figure 1:
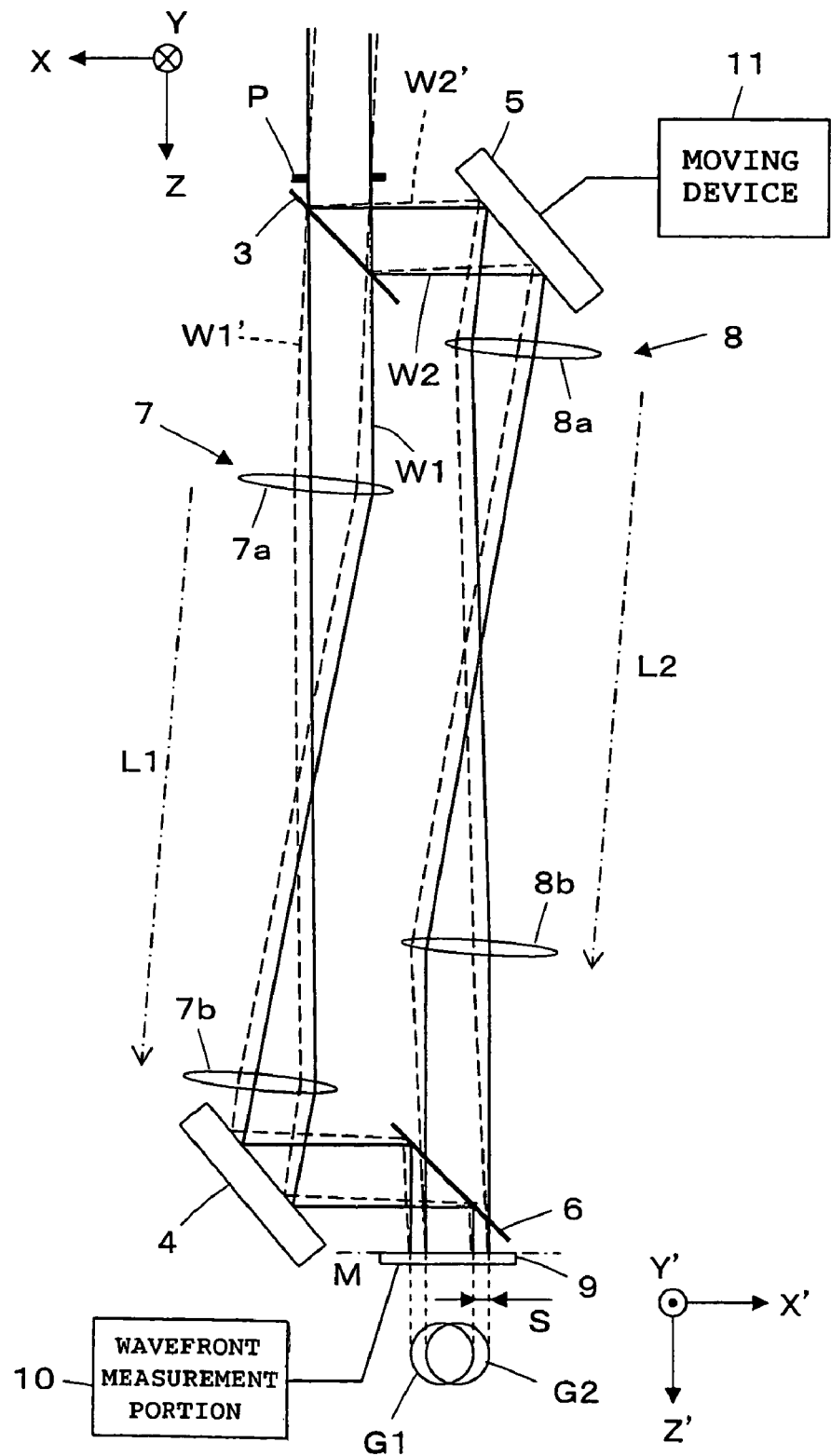
FIG. 1 is a diagram showing the construction of a wavefront sensor according to a first embodiment of the present invention.

FIG. 1 shows the construction of a wavefront sensor according to a first embodiment. A semi-transparent mirror 3 is arranged next to an entrance pupil P, and an optical path reaching the semi-transparent mirror 3 from the entrance pupil P is split into a first optical path L1 and a second optical path L2 by means of the semi-transparent mirror 3. A first flat mirror 4 is arranged on the first optical path L1 that is transmitted through the semi-transparent mirror 3, and a second flat mirror 5 is arranged on the second optical path L2 that is reflected by the semi-transparent mirror 3. A semi-transparent mirror 6 is arranged at a position where the first optical path L1 that has been reflected by the first flat mirror 4 and the second optical path L2 that has been reflected by the second flat mirror 5 intersect with each other. The first optical path L1 and the second optical path L2 are combined again with each other by the semi-transparent mirror 6 in a state where the first and second optical paths L1 and L2 are displaced from each other by a shearing quantity S. Further, an interference measurement plane M is defined next to the semi-transparent mirror 6. Note that the entrance pupil P is defined within an X-Y plane, and a Z-axis is a light traveling direction on the axis of the entrance pupil P. Also, the interference measurement plane M is defined within an X'-Y' plane, and the second optical path L2 is combined with the first optical path L1 in a state where the former is displaced from the latter by the shearing quantity S in a +X' direction. Also, a Z' axis is a light traveling direction on the axis on the interference measurement plane M.

Also, a first optical path difference compensation member 7 is arranged between the semi-transparent mirror 3 and the first flat mirror 4 on the first optical path L1, and a second optical path difference compensation member 8 is arranged between the second flat mirror 5 and the semi-transparent mirror 6 on the second optical path L2. The first optical path difference compensation member 7 and the second optical path difference compensation member 8 are members for removing the optical path difference that occurs depending on the incident angle of the optical wavefront to be measured with respect to the entrance pupil P.

The first optical path difference compensation member 7 includes an imaging lens 7a that is arranged behind the semi-transparent mirror 3 and inclined by an angle φ with respect to the optical axis of the first optical path L1, and a collimator lens 7b that is arranged in parallel with the imaging lens 7a. The imaging lens 7a and the collimator lens 7b have a common focal length F, and are separated from each other by a distance 2·F on their optical axes.

The second optical path difference compensation member 8 includes an imaging lens 8a that is arranged behind the second flat mirror 5 and inclined by an angle −φ with respect to the optical axis of the second optical path L2, and a collimator lens 8b that is arranged in parallel to the imaging lens 8a. The imaging lens 8a and the collimator lens 8b have the same focal length F as that of the imaging lens 7a and the collimator lens 7b of the first optical path difference compensation member 7, and are separated from each other by a distance 2·F on their optical axes.

Further, a photodetector 9 for measuring an intensity distribution of an interference fringe is arranged on the interference measurement plane M, and the photodetector 9 is connected with a wavefront measurement portion 10. The photodetector 9 is formed of, for example, a CCD, and the wavefront measurement portion 10 obtains a configuration of the optical wavefront to be measured based on measurement data that has been obtained by the photo detector 9. The wave front measurement portion 10 is formed of, for example, a computer.

Also, the second flat mirror 5 is connected with a moving device 11 that moves the arrangement position and the angle of the second flat mirror 5 to produce an arbitrary relative optical path difference between the optical paths L1 and L2.

Subsequently, description will be given of the operation of the wavefront sensor according to the first embodiment. The optical wavefront to be measured that has entered the entrance pupil P travels in the Z-direction, and is split into the first optical path L1 and the second optical path L2 by the semi-transparent mirror 3. After a wavefront W1 that travels in the first optical path L1 is transmitted through the imaging lens 7a and the collimator lens 7b of the first optical path difference compensation member 7, the wavefront W1 is reflected by the first flat mirror 4 and travels toward the semi-transparent mirror 6. On the other hand, after a wavefront W2 that travels in the second optical path L2 is reflected by the second flat mirror 5, the wavefront W2 is transmitted through the imaging lens 8a and the collimator lens 8b of the second optical path difference compensation member 8, and travels toward the semi-transparent mirror 6. The wavefront W1 that travels in the first optical path L1 and the wavefront W2 that travels in the second optical path L2 are combined together again by the semi-transparent mirror 6 in a state where the wavefronts W1 and W2 are displaced laterally from each other by the shearing quantity S, and reach the interference measurement plane M. The entrance pupil P is imaged again on the interference measurement plane M. A pupil image G2 from the second optical path L2 is displaced from a pupil image G1 from the first optical path L1 by the shearing quantity S in the +X' direction so as to partially overlap with the latter. As a result, the wavefront W1 that travels in the first optical path L1 and the wavefront W2 that travels in the second optical path L2 interfere with each other in a laterally displaced state to form the interference fringe on the interference measurement plane M.

The intensity distribution of the interference fringe is measured by the photodetector 9 that is arranged on the interference measurement plane M, and the intensity distribution is sent to the wavefront measurement portion 10 to measure the configuration of the optical wavefront to be measured.

Alternatively, the arrangement position or the angle of the second flat mirror 5 may be moved by the moving device 11. In this case, the interference fringe may be formed on the interference measurement plane M in a state where the optical path difference between the first optical path L1 and the second optical path L2 is shifted to $\lambda/4$, $\lambda/2$, or $3\lambda/4$ where $\lambda$ is the wavelength of the optical wave to be measured. As a result, the wavefront measurement portion 10 can measure the configuration of the optical wavefront to be measured using the intensity distribution of the interference fringe which has been measured by the photodetector 9 in addition.

Figure 2:
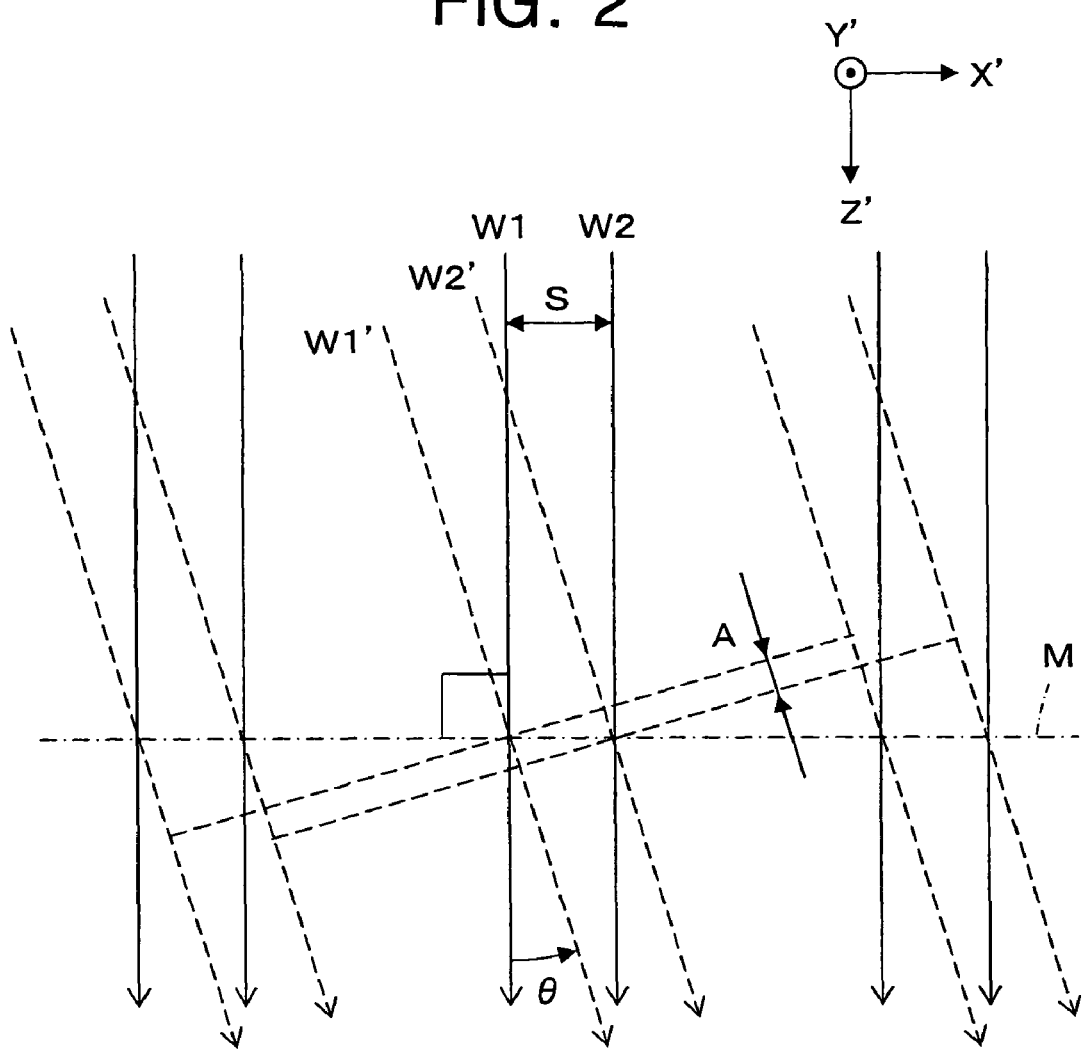
FIG. 2 is a diagram showing a state in which a wavefront arrives at an interference measurement plane.

When the optical wavefront to be measured enters the entrance pupil P along the optical axis, both the wavefront W1 passing through the first optical path L1 and the wavefront W2 passing through the second optical path L2 travel perpendicularly to the interference measurement plane M as shown in FIG. 2. Therefore, no optical path difference occurs between the wavefronts W1 and W2 when they reach the interference measurement plane M. However, if the optical wavefront to be measured enters the entrance pupil P from a direction inclined with respect to the optical axis, the traveling directions of the wavefront W1' that has passed through the first optical path L1 and the wavefront W2' that has passed through the second optical path L2 are inclined from the optical axis by an angle θ in the +X' direction from the Z' axis within the X'-Z' plane to reach the interference measurement plane M. Then, if there is no optical path difference compensation member, the wavefront W2' that has passed through the second optical path L2 advances with respect to the wavefront W1' that has passed through the first optical path L1 by an optical path difference A, and it is found that the optical path length of the wavefront W1' in the first optical path L1 is longer than the optical path length of the wavefront W2' in the second optical path L2 by the optical path difference A. The optical path difference A that occurs in this situation is represented by the following expression.

$$A = S \cdot \sin \theta \qquad (1)$$

where S is the shearing quantity between the first optical path L1 and the second optical path L2.

As described above, the optical path difference A occurs between the wavefront W1' and the wavefront W2' due to the arrival direction of the optical wavefront to be measured, that is, due to the incident angle to the entrance pupil P when the wavefronts W1' and W2' reach the interference measurement plane M. However, the optical path difference A is compensated in advance by the working of the first optical path difference compensation member 7 that is arranged on the first optical path L1 and the second optical path difference compensation member 8 that is arranged on the second optical path L2. Hereinafter, the compensation operation will be described.

Figure 3:
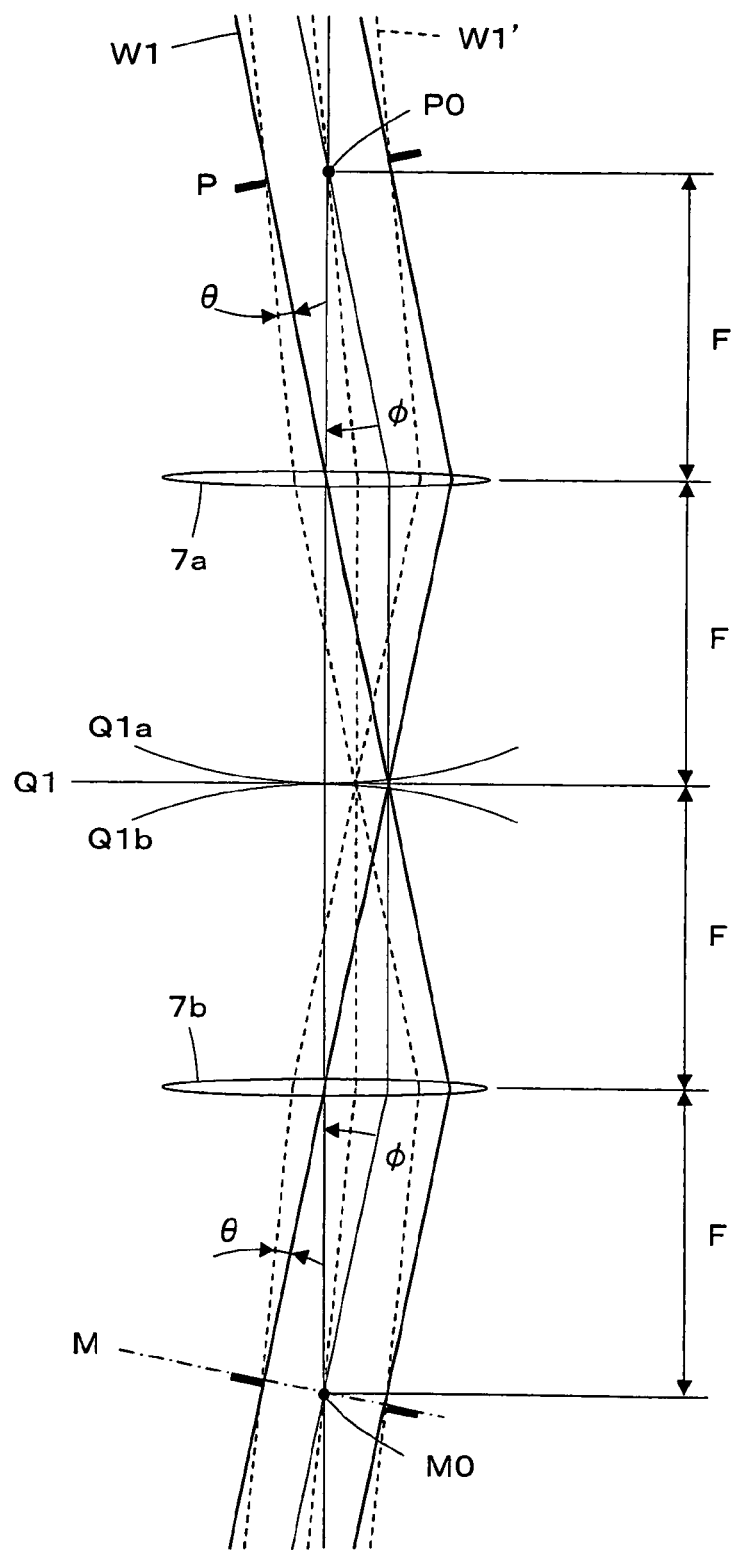
FIG. 3 is a diagram showing a state in which the wavefront is transmitted through a first optical path difference compensation member.

As shown in FIG. 3, in the first optical path difference compensation member 7, the imaging lens 7a and the collimator lens 7b are arranged in parallel to each other, and also separated from each other on their optical axes by a distance 2·F. Therefore, the imaging lens 7a and the collimator lens 7b have a common focal plane Q1. However, in fact, the imaging lens 7a and the collimator lens 7b have curved equal optical path length surfaces Q1a and Q1b, respectively, due to aberrations of the lenses. When points that have the same optical path length from a center point P0 on the entrance pupil P are viewed on the focal plane Q1, the points are displaced from the focal plane Q1 depending on the respective incident angle to the entrance pupil P. For that reason, an increase Δr1 of the optical path length extending from the center point P0 on the entrance pupil P to the focal plane Q1 with reference to the light on the axis of the lens can be represented as a function J(α) of the incident angle α to the imaging lens 7a.

$$\Delta r1 = J(\alpha)$$

Since the optical axis of the imaging lens 7a is inclined with respect to the first optical path L1 by the angle φ, the incident angle of the light that enters the entrance pupil P at the angle θ with respect to the imaging lens 7a becomes (θ−φ), and the increase Δr1 of the optical path length is represented by the following expression.

$$\Delta r1 = J(\theta - \phi)$$

It is assumed that the optical path that extends from the focal plane Q1 to the interference measurement plane M on which the entrance pupil P is imaged again by the collimator lens 7b is symmetrical with the optical path that extends from the entrance pupil P to the focal plane Q1. Then, those optical paths are equal to each other in the increase Δr1 of the optical path length, and the increase ΔR1 of the optical path length that extends from the center point P0 on the entrance pupil P through the first optical path L1 to the center point M0 of the pupil which has been imaged again on the interference measurement plane M is represented by the following expression.

$$\Delta R1 = 2 \cdot \Delta r1 = 2 \cdot J(\theta - \phi) \qquad (2)$$

Figure 4:
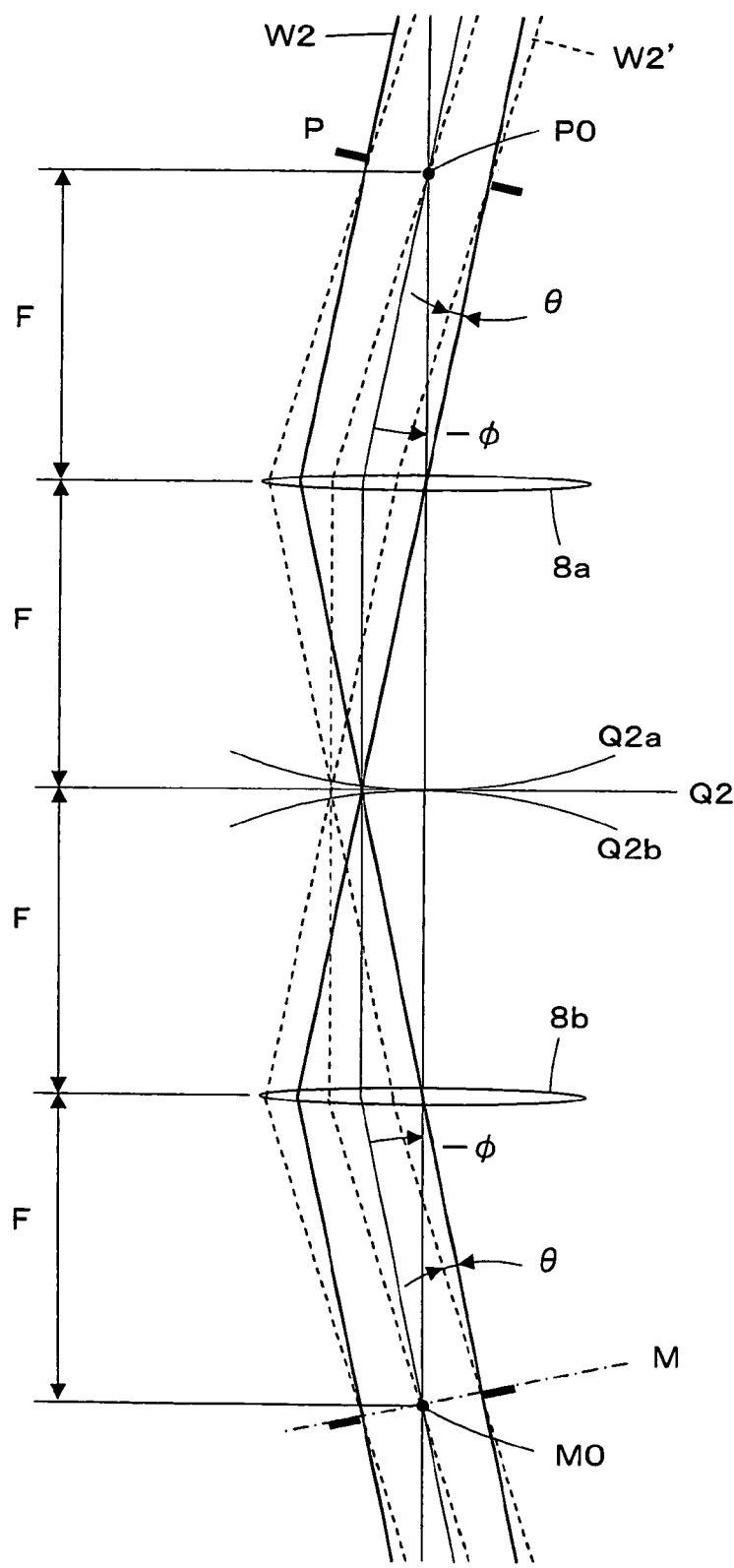
FIG. 4 is a diagram showing a state in which the wavefront is transmitted through a second optical path difference compensation member.

Likewise, as shown in FIG. 4, in the second optical path difference compensation member 8, the imaging lens 8a and the collimator lens 8b are arranged in parallel to each other, and also separated from each other on their optical axes by the distance 2·F. Therefore, the imaging lens 8a and the collimator lens 8b have a common focal plane Q2. However, in fact, the imaging lens 8a and the collimator lens 8b have curved equal optical path length surfaces Q2a and Q2b, respectively, due to the aberration of the lenses. When points that have the same optical path length from a center point P0 on the entrance pupil P are viewed on the focal plane Q2, the points are displaced from the focal plane Q2 depending on respective incident angle to the entrance pupil P. For that reason, an increase Δr2 of the optical path length extending from the center point P0 on the entrance pupil P to the focal plane Q2 with reference to the light on the axis of the lens can be represented as a function J(α) of the incident angle α to the imaging lens 8a.

$$\Delta r2 = J(\alpha)$$

Since the optical axis of the imaging lens 8a is inclined with respect to the second optical path L2 by the angle (−φ), the incident angle of the light that enters the entrance pupil P at the angle θ with respect to the imaging lens 8a becomes (θ+φ), and the increase Δr2 of the optical path length is represented by the following expression.

$$\Delta r2 = J(\theta + \phi)$$

It is assumed that the optical path that extends from the focal plane Q2 to the interference measurement plane M on which the entrance pupil P is imaged again by the collimator lens 8b is symmetrical with the optical path that extends from the entrance pupil P to the focal plane Q2. Then, those optical paths are equal to each other in the increase Δr2 of the optical path length, and the increase ΔR2 of the optical path length that extends from the center point P0 on the entrance pupil P through the second optical path L2 to the center point M0 of the pupil which has been imaged again on the interference measurement plane M is represented by the following expression.

$$\Delta R2 = 2 \cdot \Delta r2 = 2 \cdot J(\theta + \phi) \qquad (3)$$

Accordingly, it is found from Expressions (2) and (3) that the following optical path difference B occurs between the wavefront W1' that travels in the first optical path L1 and the wavefront W2' that travels in the second optical path L2, which are inclined from the optical axis by the angle θ, respectively, with the provision of the first optical path difference compensation member 7 and the second optical path difference compensation member 8 because the optical wavefront to be measured enters the entrance pupil P from the direction inclined with respect to the optical axis.

$$B = \Delta R1 - \Delta R2 = 2 \cdot J(\theta - \phi) - 2 \cdot J(\theta + \phi) \qquad (4)$$

In general, the function J(α) indicative of the increase in the optical path length which extends from the center point on the entrance pupil to the focal plane when the equal optical path length surface is curved due to aberrations of the lens can be represented by the even-order polynomial of α, which is equal to or higher than the second order polynomial. That is, $$J(\alpha) = a\alpha^2 + b\alpha^4 + \ldots \quad (5)$$

If the function $J(\alpha)$ is represented by a quadratic expression, then from Expressions (4) and (5) we have the following expression.

$$\begin{aligned} B &= 2 \cdot a(\theta - \varphi)^2 - 2 \cdot a(\theta + \varphi)^2 \\ &= 2 \cdot a(\theta^2 - 2\theta\varphi + \varphi^2) - 2 \cdot a(\theta^2 + 2\theta\varphi + \varphi^2) \\ &= -8 \cdot a\theta\varphi \end{aligned} \quad (6)$$

A proportional constant a is known as a parameter of the imaging lenses 7a, 8a and the collimator lenses 7b, 8b to be used.

The optical path difference B represents a difference of the optical path length of the wavefront W1' that travels in the first optical path L1 from the optical path length of the wavefront W2' that travels in the second optical path L2 in the optical path difference compensation members. The optical path length of the wavefront W1' is shorter than the optical path length of the wavefront W2' contrary to the optical path difference A that occurs when the wavefront is inclined and reaches the interference measurement plane M and that is represented by Expression (1). Therefore, if the absolute values of the optical path difference A and the optical path difference B are made substantially equal to each other within an error of a wavelength or lower, the optical path difference A is compensated.

That is, the following expression can be satisfied.

$$A \approx -B$$

In other words, the total optical path difference C obtained by adding the optical path difference A and the optical path difference B can be set to substantially 0.

$$A + B = C \approx 0$$

The following expression is obtained with the use of Expressions (1) and (6).

$$S \cdot \sin\theta - 8 \cdot a\theta\varphi \approx 0 \quad (7)$$

When the absolute value of the angle $\theta$ is small, the following approximate expression is satisfied.

$$\sin\theta \approx \theta$$

Therefore, Expression (7) can be represented as follows.

$$S - 8 \cdot a\varphi \approx 0$$

In this case, the following expression is satisfied.

$$\varphi = S/(8 \cdot a) \quad (8)$$

Under the above circumstances, in the first optical path difference compensation member 7, the optical axes of the imaging lens 7a and the collimator lens 7b are inclined with respect to the optical axis of the first optical path L1 by the angle $\varphi = S/(8 \cdot a)$. In the second optical path difference compensation member 8, the optical axes of the imaging lens 8a and the collimator lens 8b are inclined with respect to the optical axis of the second optical path L2 by an angle $-\varphi = -S/(8 \cdot a)$. With the above construction, the substantially same interference state can be obtained on the interference measurement plane M even when the optical wavefronts to be measured arrive from different directions. For that reason, light of the same interference state is combined together on the interference measurement plane M for the wavefront from light sources which cannot be regarded as one point, such as a surface light source or a plurality of point light sources, or the wavefront from a point light source that moves beyond a distance that is regarded as one point due to vibrations of a device or the like. This enables the configuration of the optical wavefront to be measured to be obtained by the wavefront measurement portion 10 based on the intensity distribution of the interference fringe which has been measured by the photodetector 9.

If the first and second optical path difference compensation members 7 and 8 are inclined by the angles $\varphi$ and $-\varphi$, respectively, so that light that has passed through the first and second optical path difference compensation members 7 and 8 and has been collimated cannot be regarded as parallel light, respectively, it is preferable that the distance 2·F between the imaging lens 7a and the collimator lens 7b and the distance 2·F between the imaging lens 8a and the collimator lens 8b be finely adjusted so that the light that has passed through the first and second optical path difference compensation members 7 and 8 and has been collimated is regarded as parallel light, respectively.

Further, even when the traveling directions of the wavefronts W1' and W2' are inclined reversely to the angle $\theta$ shown in FIGS. 1, 3, and 4, the optical path difference that is caused by their inclinations are similarly compensated by the working of the first and second optical path difference compensation members 7 and 8 in advance, thereby enabling substantially the same interference state to be obtained on the interference measurement plane M.

Note that, in the above description, the function $J(\alpha)$ indicative of the increase of the optical path length which extends from the center point on the entrance pupil to the focal plane in the case where the equal optical path length surface is curved by aberrations of the lens is represented by a quadratic expression. Alternatively, even when the function $J(\alpha)$ is represented by an even-order polynomial which is equal to or higher than the fourth-order polynomial, the inclined angles $\varphi$ of the imaging lenses 7a, 8a and the collimator lenses 7b, 8b can be obtained in a similar manner so that the total optical path difference C becomes substantially a constant value 0 regardless of the value of the incident angle $\theta$.

Figure 5:
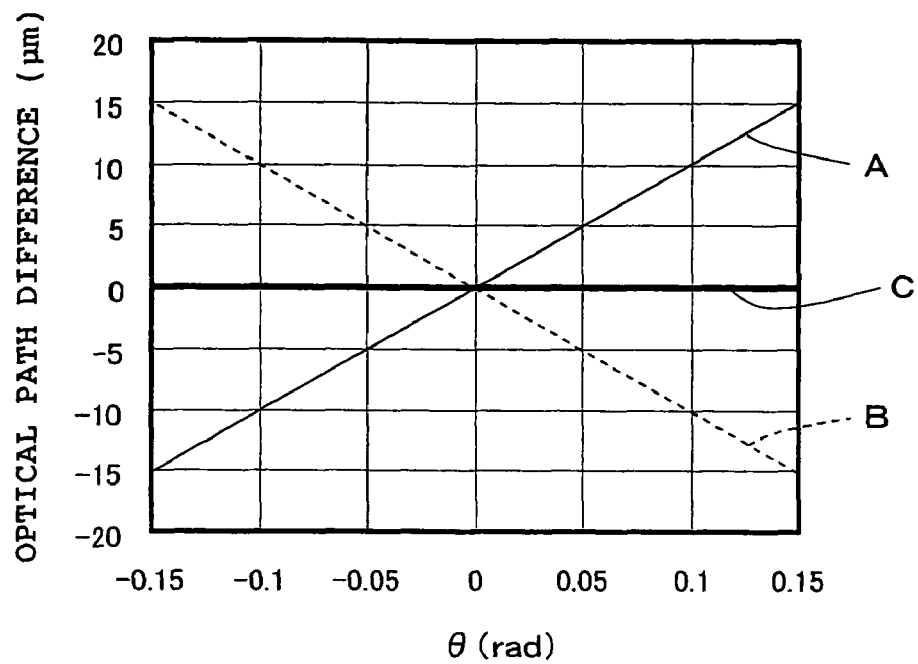
FIG. 5 is a graph showing simulated results of an optical path difference when the incident angle of an optical wavefront to be measured is changed one-dimensionally in the wavefront sensor according to the first embodiment.

Here, FIG. 5 shows the results obtained by simulating the optical path difference A that occurs when the wavefront reaches the interference measurement plane M, the optical path difference B that occurs due to the first and second optical path difference compensation members 7 and 8, and the total optical path difference C obtained by adding the optical path differences A and B, respectively. In this example, the shearing quantity S is 100 μm, the proportional constant a of the function $J(\alpha)$ indicative of the increase of the optical path length in the imaging lenses 7a, 8a or the collimator lenses 7b, 8b is 500 μm, the absolute value of the inclined angles $\varphi$ and $-\varphi$ from the optical axes of the first and second optical path difference compensation members 7 and 8 is 0.025 rad, and the incident angle $\theta$ of the optical wavefront to be measured which has entered the entrance pupil P is variously changed in the +X direction and −X direction. Note that, in FIG. 5, the axis of abscissa is $\theta$(rad), and the axis of ordinate is an optical path difference (μm). FIG. 5 shows how the optical path difference A changes according to the value of the incident angle $\theta$, and how the optical path difference B changes so as to compensate the optical path difference A. The total optical path difference C obtained by adding the optical path difference A and the optical path difference B is kept substantially the constant value 0 regardless of the value of the incident angle $\theta$.

Figure 6:
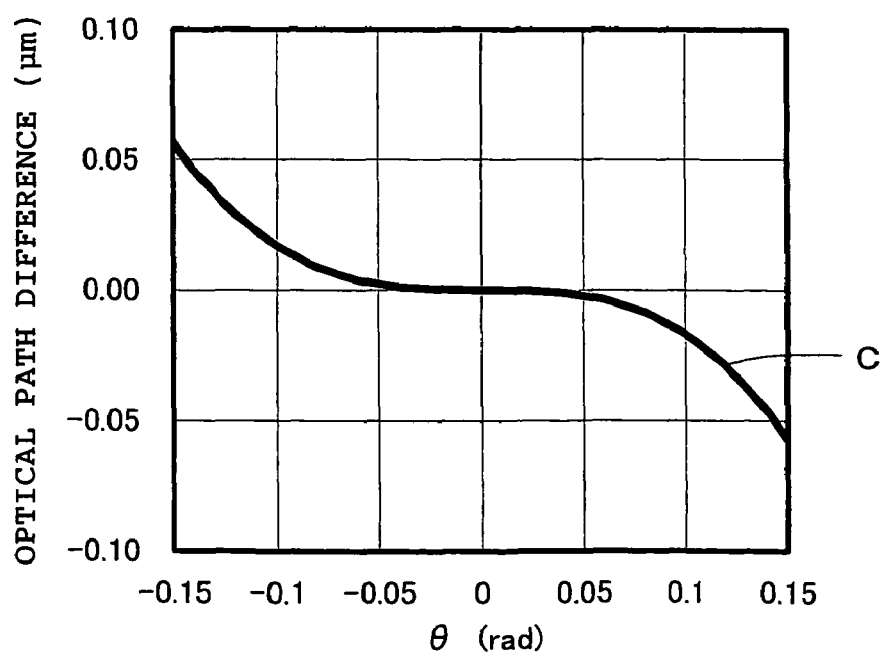
FIG. 6 is a graph enlarging the axis of ordinates of FIG. 5.

FIG. 6 shows a graph that enlarges the axis of ordinate of FIG. 5 representative of the optical path difference by 200 power. The total optical path difference C changes according to the value of the incident angle θ, and is a value that is equal to or lower than ±60 nm in a range of −0.15≦θ≦+0.15 (rad) (i.e. absolute value of angle θ≦about 8.6 degrees). When the shearing quantity S is 100 μm, and no optical path difference compensation member is provided, since A=S·sin θ from Expression (1), the following expression must be satisfied:

−0.00006≦0.1·sin θ≦0.00006, in order to keep the optical path difference A to ±60 nm or lower. That is, −0.0006≦sin θ≦0.0006

When the absolute value of the angle θ is small as described above, since sin θ≈θ, the following expression is substantially satisfied.

−0.0006≦θ≦0.0006 (rad)

Thus, it is found that the angle range by which the same optical path difference occurs is widened by about 250 power by application of the optical path difference compensation member.

In the above-mentioned example, the inclined angle φ which satisfies Expression (8) is used. However, if the inclined angles φ and −φ from the optical axes of the first and second optical path difference compensation members 7 and 8 are finely adjusted, it is possible to compensate the optical path difference for a wider angle range.

Also, in the above-mentioned example, the angle range in which the optical path difference can be compensated is compared between the case where the optical path difference compensation member is applied and the case where the optical path difference compensation member is not applied within the tolerance of ±60 nm or lower for the optical path difference C and the optical path difference A. However, if the tolerance for the optical path difference C and the optical path difference A changes, the angle range in which the optical path difference can be compensated changes accordingly.

Figure 7:
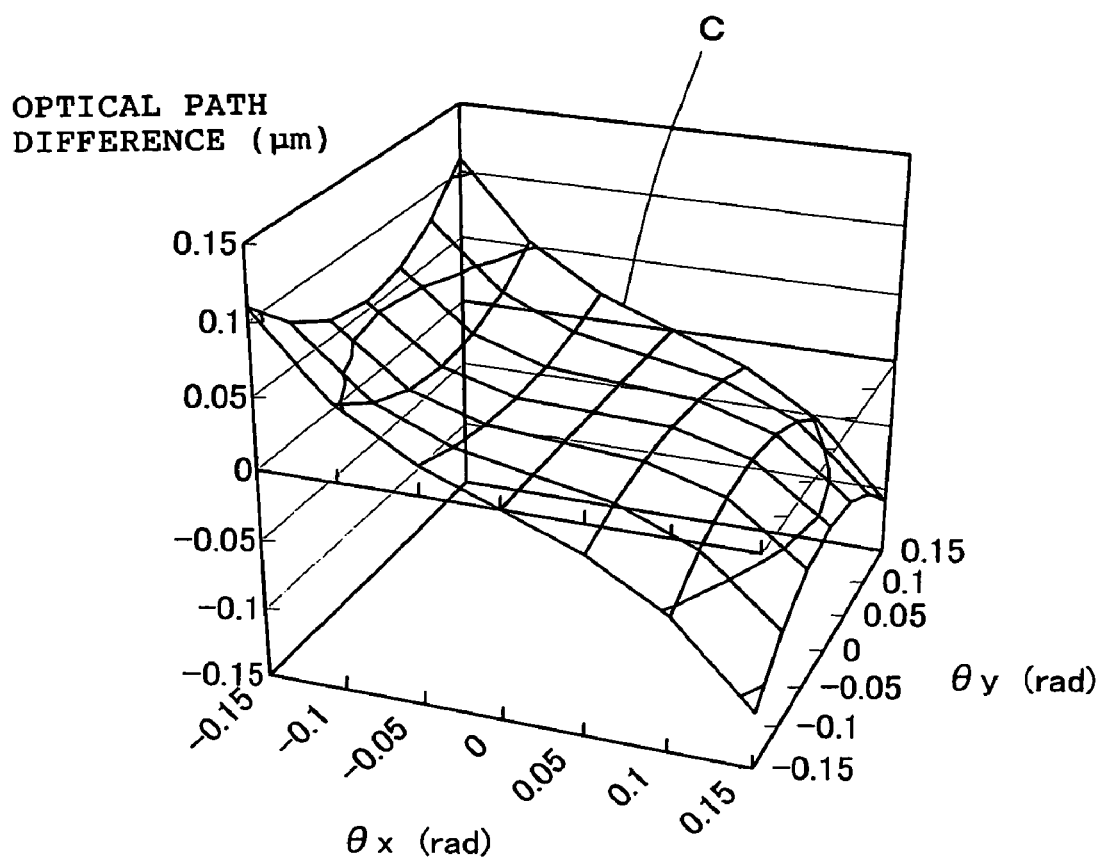
FIG. 7 is a graph showing simulated results of an optical path difference when the incident angle of an optical wavefront to be measured is two-dimensionally changed in the wavefront sensor according to the first embodiment.

FIG. 7 shows the results obtained by simulating the total optical path difference C where the shearing quantity S and the parameters of the imaging lens 7a, the collimator lens 7b, the imaging lens 8a, and the collimator lens 8b are made identical to those of the above-mentioned simulation and the incident angle θ of the optical wavefront to be measured that enters the entrance pupil P is variously changed two-dimensionally in the X-Y direction. FIG. 7 shows the values of the optical path difference C with respect to the angles θx and θy when the traveling direction of the incident light is projected on the X-Z plane and the Y-Z plane. FIG. 7 enlarges the optical path difference C in the axis of ordinate as in FIG. 6 in a range of ±0.15 μm.

The optical path difference C changes according to the values of the incident angles θx and θy, and is a value that is equal to or lower than ±0.11 μm in a range of −0.15≦θx≦+0.15 (rad), and −0.15≦θy≦+0.15 (rad). It is found that the optical path difference of the wavefront is compensated with high precision, and the wavefront can be measured without changing the interference state.

Second Embodiment

Figure 8:
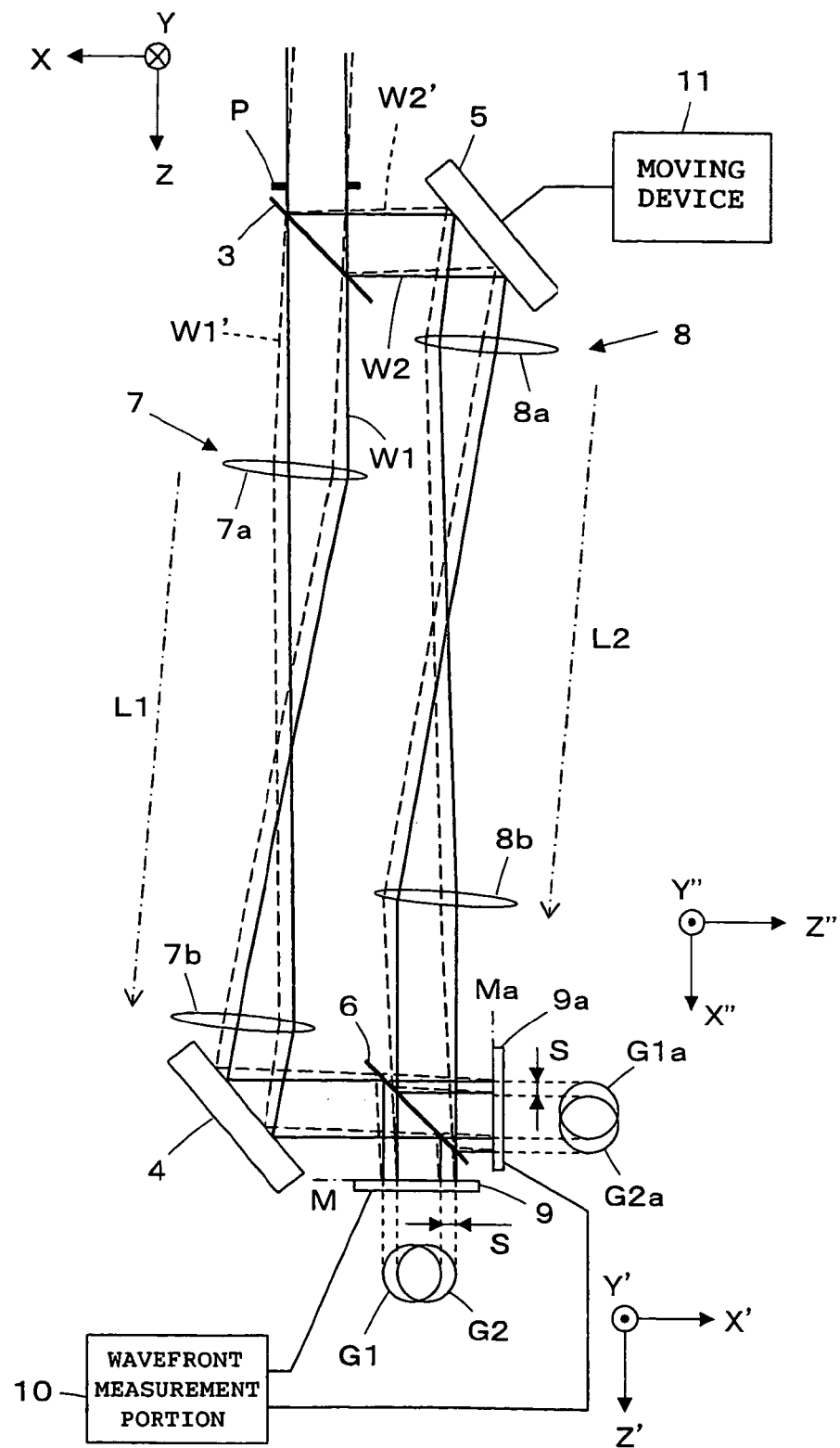
FIG. 8 is a diagram showing a construction of a wavefront sensor according to a second embodiment.

In the wavefront sensor according to the above-mentioned first embodiment, the first optical path L1 that has been reflected by the semi-transparent mirror 6 and the second optical path L2 that has been transmitted through the semi-transparent mirror 6 are combined together in the state where those paths L1 and L2 are displaced from each other by the shearing quantity S. However, the first optical path L1 that has been transmitted through the semi-transparent mirror 6 and the second optical path L2 that has been reflected by the semi-transparent mirror 6 may also be combined together in a state where those paths L1 and L2 are displaced from each other by the shearing quantity S. Under these circumstances, in this second embodiment, as shown in FIG. 8, an interference measurement plane Ma is defined at a position where an entrance pupil P is imaged again by a wavefront W1 that has traveled in a first optical path L1 and has been transmitted through a semi-transparent mirror 6 and a wavefront W2 that has traveled in a second optical path L2 and has been reflected by the semi-transparent mirror 6. A photodetector 9a is arranged on the interference measurement plane Ma. A wavefront measurement portion 10 is connected to both of the photodetector 9 arranged on an interference measurement plane M and the photodetector 9a arranged on the interference measurement plane Ma.

The wavefront measurement portion 10 measures a configuration of an optical wavefront to be measured based on the intensity distribution of an interference fringe which has been obtained by both of the photodetectors 9 and 9a.

In this example, the interference measurement plane Ma is defined within a X"-Y" plane, and the second optical path L2 is combined with the first optical path L1 in a state where the former is displaced from the latter by a shearing quantity S in a +X" direction. Also, the Z" axis is the traveling direction of the light on the axis on the interference measurement plane Ma.

The incident pupil P is imaged again on the interference measurement plane Ma by the wavefront W1 that has traveled in the first optical path L1 and has been transmitted through the semi-transparent mirror 6 and the wavefront W2 that has traveled in the second optical path L2 and has been reflected by the semi-transparent mirror 6. A pupil image G2a from the second optical path L2 is displaced from a pupil image G1a from the first optical path L1 by the shearing quantity S in the +X" direction so as to partially overlap with the latter. The interference fringes that have been inverted in light and dark with respect to the interference fringe that is formed on the interference measurement plane M are obtained on the interference measurement plane Ma at the same time. For that reason, not only can the phase difference between the two wavefronts W1 and W2, but the total of light intensity of the two wavefronts W1 and W2, i.e. the light intensity at the pupil plane P be obtained from the sum of intensities at the two interference measurement planes M and Ma, and it is possible to reduce an error caused by a change in the brightness at the pupil plane upon calculating the wavefront by the wavefront measurement portion 10.

The imaging lens 7a, the collimator lens 7b, the imaging lens 8a, and the collimator lens 8b used in the first and second embodiments of the present invention can be made of various materials having an optical transparency, such as glass, crystal, resin, or plastic.

Also, a similar advantage can be obtained by using a reflector such as a concave mirror instead of the lens provided that it is optical system capable of imaging and collimating. Further, either the imaging or collimating can be done by a lens whereas the other can be done by a reflector.

Further, according to the present invention, since the shearing interferometry is used, only a derivative (differential) quantity of the wavefront, in a direction along which the two optical paths are displaced, is measured. For that reason, in the case of measuring the two-dimensional wavefront configuration, it is desirable to split the optical wavefront to be measured into two wavefronts, to measure the derivative (differential) quantities of the wavefronts in two different directions by two wavefront sensors, respectively, and to analyze those derivative quantities together.

Further, according to the present invention, since the shearing interferometry is used, in the case of using a wide-band light, it is desirable to adjust the optical path lengths of the first optical path L1 and the second optical path L2 to be equal to each other with a precision of a light coherence length or better.

Figure 9:
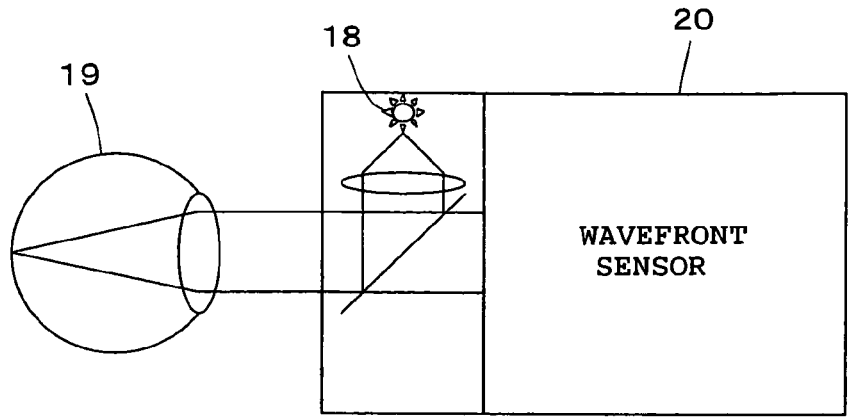
FIG. 9 is a diagram showing a state in which the wavefront sensor of the present invention is applied to aberration measurement of an eyeball optical system.

The present invention can be applied to a wide range of wavefront measurements. For example, as shown in FIG. 9, the interior of an eyeball 19 may be illuminated with an illuminating light from an illumination light source 18, and its reflected light may be captured by a wavefront sensor 20 of the present invention. As a result, the present invention can be used in the aberration measurement of cornea/eyeball optical systems, eyesight tests, or adaptive optics of a fundus retinal camera and retina test camera, or the like. In this case, it is unnecessary to form a small reference light spot for wavefront measurement on a retina as in the conventional art. The illuminating light consisting of a white light is merely diffused and irradiated widely, thereby enabling the wavefront measurement by using the light of a required range which is selected within the wavefront sensor 20.

Figure 10:
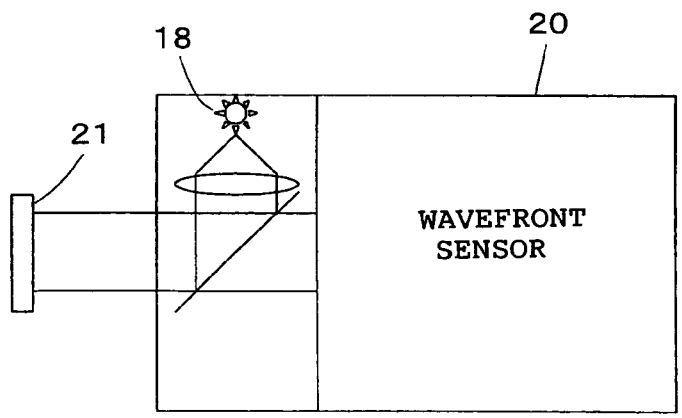
FIG. 10 is a diagram showing a state in which the wavefront sensor of the present invention is applied to aberration measurement of an optical element.
Figure 11:
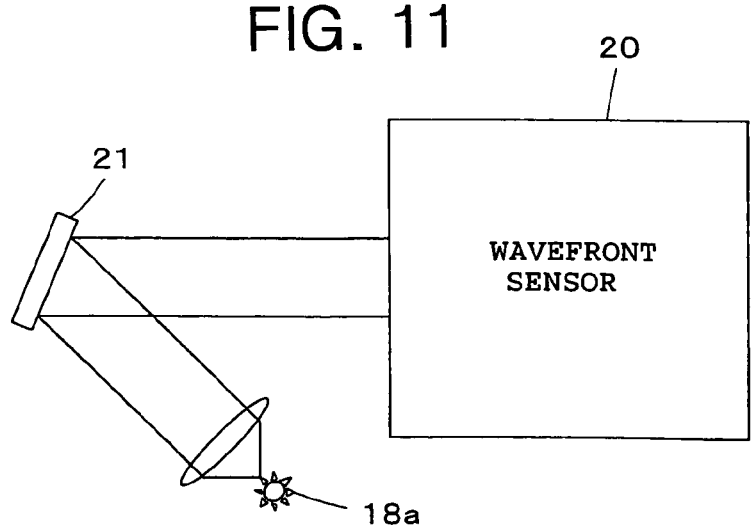
FIG. 11 is a diagram showing a state in which the wavefront sensor of the present invention is applied to another aberration measurement of an optical element.

In a similar manner, as shown in FIG. 10, an optical element 21 may be irradiated with the illuminating light from the illumination light source 18, and its reflected light may be captured by the wavefront sensor 20, thereby enabling any aberration of the optical element 21 to be measured. Also, as shown in FIG. 11, the optical element 21 may be irradiated with the illuminating light from an external light source 18a to enable its reflected light to be captured by the wavefront sensor 20. Tests of lens, mirrors, etc., or performance evaluation of glasses or contact lenses can be conducted based on the above-mentioned method. Note that it is necessary to add an optical system required to enter the reflected light to the wavefront sensor 20, or change the arrangement position of the optical element 21 according to the optical element 21 to be measured. For example, in the case where a light transmission element such as a parallel plane substrate is to be measured, a reference mirror is disposed at the position of the optical element 21 shown in FIG. 10 or FIG. 11, and the light transmission element is inserted into the parallel light for measurement. Also, in the case where a convex lens is to be measured in FIG. 10, a reference concave spherical mirror is disposed at the position of the optical element 21. After focusing has once been conducted by the convex lens, the light can be returned to an original direction by the reference concave spherical mirror.

The illumination light source 18 and the external light source 18a do not have to be point light sources such as pin poles, and may be light sources spread within a tolerance for the wavefront sensor 20. Even under the condition where the positional relation between the optical element 21 and the wavefront sensor 20 changes relatively due to vibrations, the wavefront can be measured if a change in the incident angle of the wavefront to be measured is within the tolerance of the wavefront sensor 20.

Figure 12:
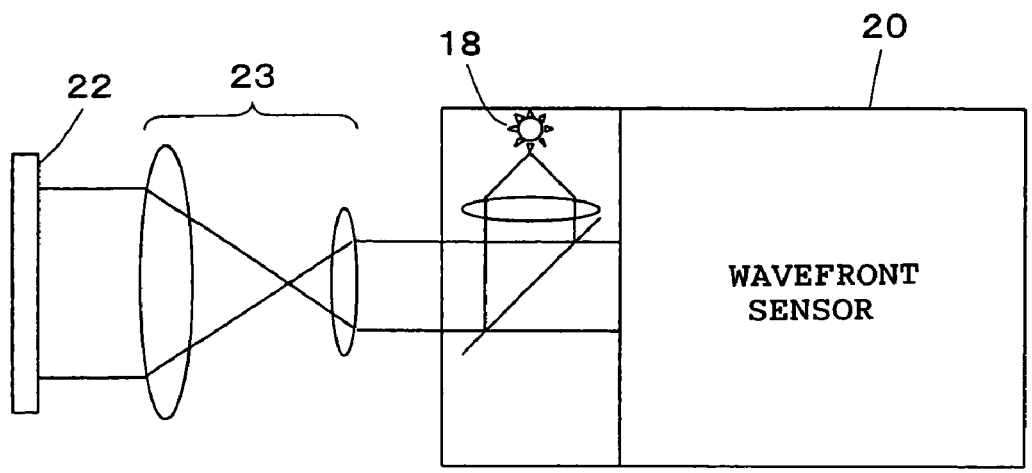
FIG. 12 is a diagram showing a state in which the wavefront sensor of the present invention is applied to still another aberration measurement of an optical element.

Also, as shown in FIG. 12, if a large-sized optical element 22 is to be measured, it is preferable to enlarge the beam diameter from the illumination light source 18 by the aid of an optical element 23.

Figure 13:
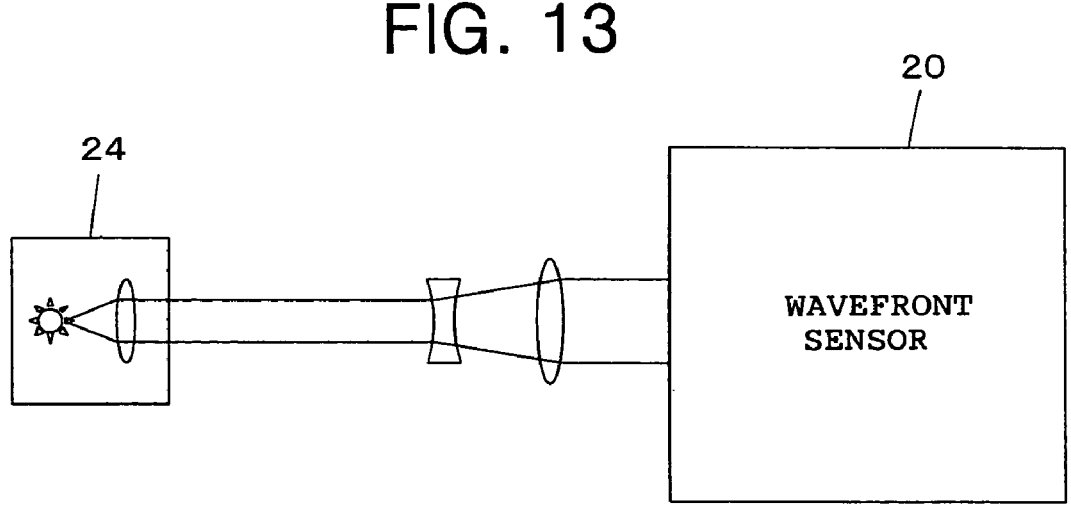
FIG. 13 is a diagram showing a state in which the wavefront sensor of the present invention is applied to quality inspection of a light source.

Further, as shown in FIG. 13, the light issued from a light source 24 may enter the wavefront sensor 20 to conduct the quality inspection of the light source 24.

Still further, the present invention may be applied to wavefront measurement for an astronomical adaptive optics device, thereby enabling the wavefront measurement using a background light that is spread such as a wide-range astronomical light or a zodiacal light. As a result, it is possible to conduct the adaptive optics observation of a celestial body which could not be achieved by a conventional wavefront sensor, such as a celestial body whose point light source is difficult to ensure such as the sun's surface or a planet surface, or a cluster of fixed stars having a sufficient brightness for the wavefront measurement as a whole although there is no celestial body for the bright point light source. In the adaptive optics of a giant telescope, even if a laser guide star cannot be narrowed but spread, precise wavefront measurement can be conducted. However, since the wavefront sensor according to the present invention is a sensor having no sensitivity to the inclination component of the wavefront, it is preferable to use the sensor in combination with a device that measures the wavefront inclination component.

In the above embodiments, the arrangement position and the angle of the second flat mirror 5 are moved by the moving device 11 to produce the optical path difference between the optical paths L1 and L2. Alternatively, the arrangement position and the angle of the first flat mirror 4 may be moved by the moving device 11 instead of the second flat mirror 5 to produce the optical path difference between the optical paths L1 and L2.

Upon mixing the two split wavefronts together, if the phase difference between the two wavefronts is sufficiently smaller than the half wavelength, and if the mean phase difference is adjusted to be an intermediate intensity which is halfway between a strengthening interference and a weakening interference, the interference intensity and the phase difference between the two wavefronts have a monotonous relationship. As a result, the wavefront configuration can be obtained while the relative optical path length of the split optical paths L1 and L2 is fixed.

The above-mentioned first and second embodiments have been described using a Mach-Zehnder interferometer. However, the present invention is applicable to any type of interferometer which can constitute the shearing interferometer that laterally displaces two optical paths and can comprise the optical path difference compensation member.

Also, the wavefront sensor of the present invention can be applied to a wavefront measurement for laser beam control.

Further, the present invention can be applied to a method in which two wavefronts are mutually inclined on the interference measurement plane to form a large number of interference fringes, thus conducting the wavefront measurement.

What is claimed is:

1. A wavefront sensor that splits an optical wavefront to be measured into two optical paths, displaces the split optical wavefronts from each other, and mixes the wavefronts together again to measure a configuration of the optical wavefronts from an interference fringe formed on an interference measurement plane, comprising:

optical path difference compensation members, which are arranged on the two optical paths respectively, for imaging each of the wavefronts that once have been split into the two optical paths, and again collimating the imaged wavefronts to remove an optical path difference that occurs depending on an incident angle of the optical wavefront to be measured, wherein a propagation optical path difference between the two optical paths up to the interference measurement plane is kept constant regardless of the incident angle of the optical wavefront to be measured;

wherein each of the optical path difference compensation members have at least one lens, each lens being inclined with respect to a corresponding optical path by a predetermined angle; and wherein both of the optical path difference compensation members are arranged so that the respective lenses are inclined with respect to their own optical path of the two optical paths in opposite directions.

2. A wavefront sensor according to claim 1, wherein each of the optical path difference compensation members has an imaging lens and a collimator lens.

3. A wavefront sensor according to claim 1, wherein
each of the optical path difference compensation members has at least one lens which is inclined with respect to a corresponding optical path by a predetermined angle,
the split optical wavefronts are displaced from each other by a shearing quantity, and
a relationship between said predetermined angle and said shearing quantity is such that a propagation optical path difference between the two optical paths up to the interference measurement plane is kept constant regardless of the incident angle of the optical wavefront to be measured.

4. A wavefront sensor according to claim 3, wherein said predetermined angle is a function of at least one aberration parameter associated with said optical path difference compensation members, said aberration parameter including a coefficient of second order or higher.

5. A wavefront sensor according to claim 4, wherein said function is:

$$\phi = S/(8 \cdot a)$$

wherein $\phi$ is said predetermined angle, S is said shearing quantity, and "a" is a second-order coefficient of the aberration parameter.

6. A wavefront sensor according to claim 1, wherein one of said optical path difference compensation members includes an imaging lens and a collimator lens which are arranged in parallel to each other and also separated from each other on their optical axes by a distance of substantially two focal lengths.

7. A wavefront sensor according to claim 1, wherein one of said optical path difference compensation members has a lens and a reflector.

8. A wavefront sensor according to claim 1, wherein, when a wide-band light is used, the optical path lengths of the two optical paths are adjusted to be equal to each other with a precision of a light coherence length or better.

9. A wavefront sensor according to claim 1, wherein said wavefront sensor is used in aberration measurement of cornea/eyeball optical systems, eyesight tests, or adaptive optics of a fundus retinal camera and retina test camera.

10. A wavefront sensor according to claim 1, wherein said wavefront sensor is used for tests of optical elements or for performance evaluation of glasses or contact lenses.

11. A wavefront sensor according to claim 1, wherein said wavefront sensor is used for wavefront measurement in an astronomical adaptive optics device.

12. A wavefront sensor according to claim 1, wherein said wavefront sensor is used for wavefront measurement for laser beam control.

* * * * *